Dec. 6, 1949     J. G. VILLEPIGUE     2,490,664
AIRCRAFT COCKPIT ARRANGEMENT
Filed Feb. 2, 1945     3 Sheets-Sheet 1

INVENTOR.
Julius G. Villepigue
BY
His Patent Attorney

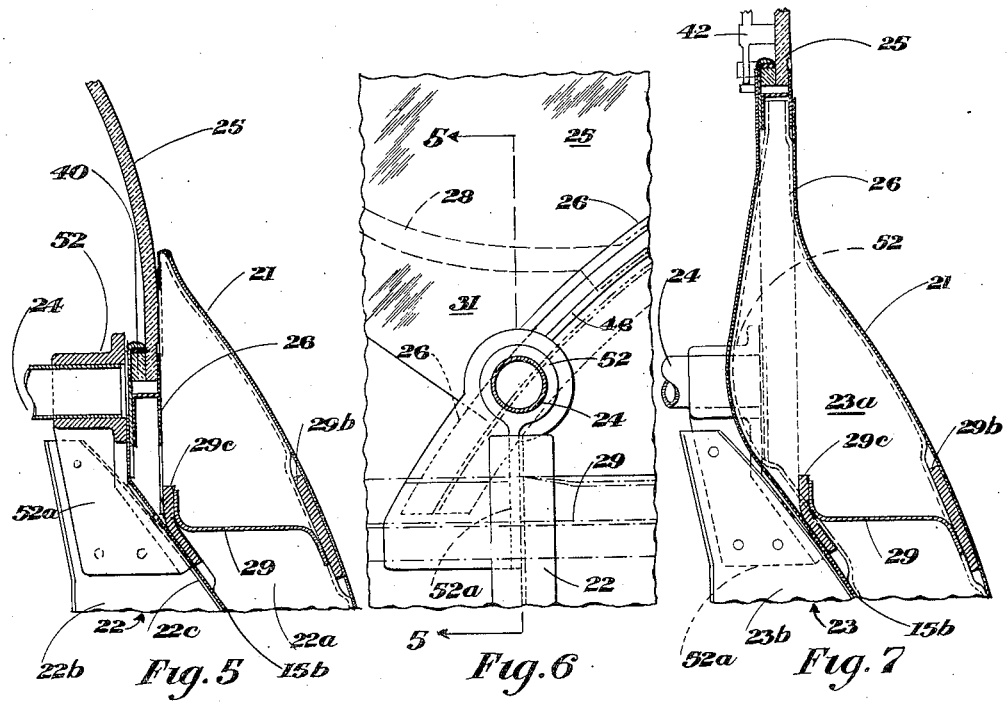
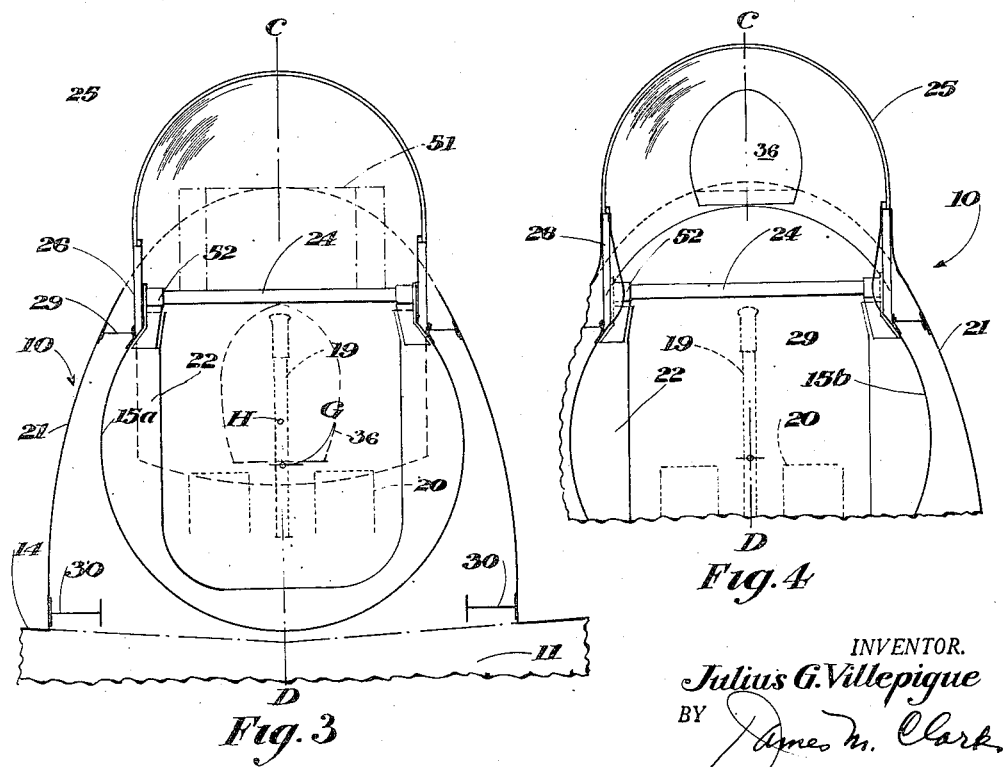

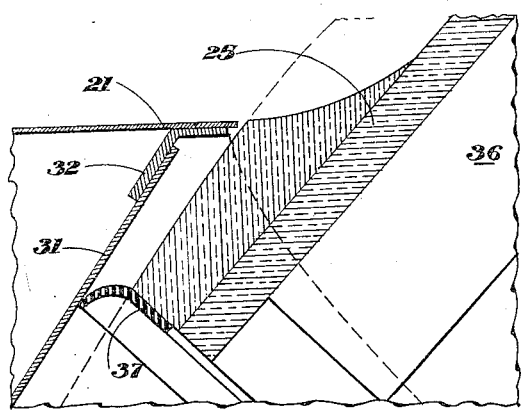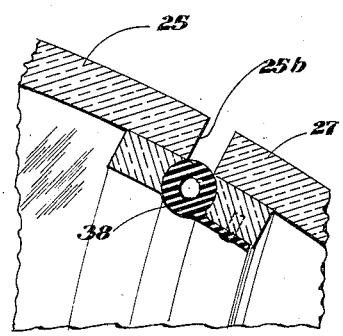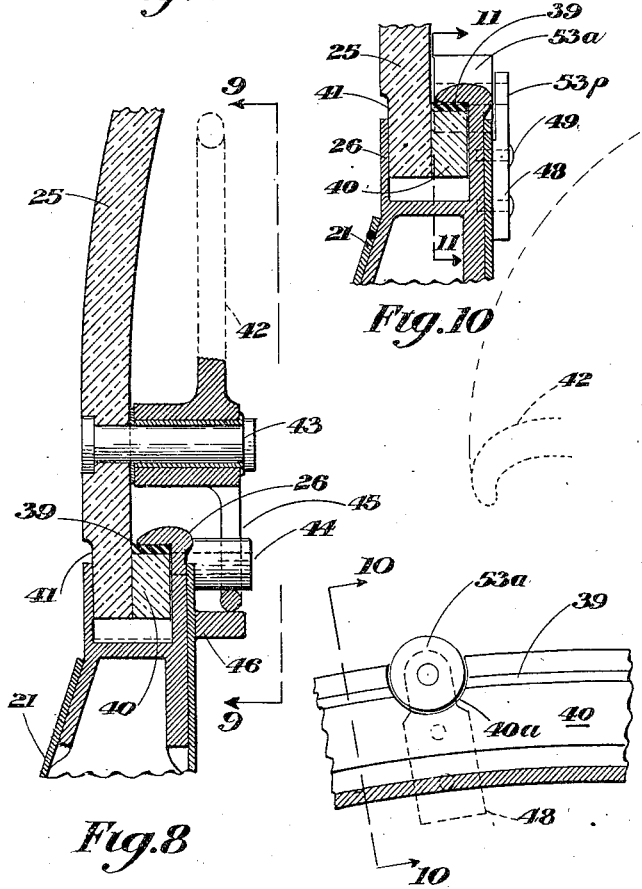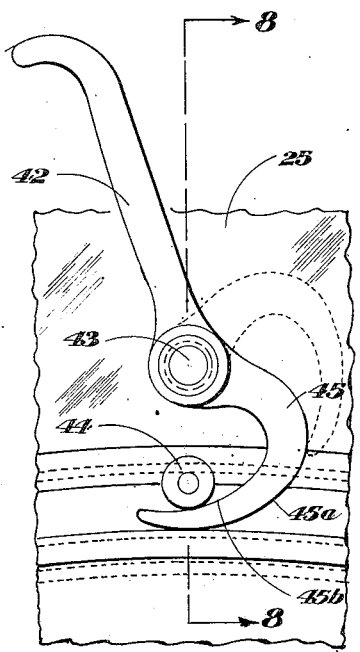

Patented Dec. 6, 1949

2,490,664

UNITED STATES PATENT OFFICE 2,490,664

AIRCRAFT COCKPIT ARRANGEMENT

Julius G. Villepigue, Inglewood, Calif., assignor to North American Aviation, Inc.

Application February 2, 1945, Serial No. 575,780

10 Claims. (Cl. 244—121)

The present invention relates to aircraft fuselage and body construction and more particularly to aircraft cockpits or compartments of the armored and pressurized type.

Military aircraft designed for operations at high altitudes present numerous problems in the design of the structure to withstand pressurization and to provide suitable armor protection of the pilot's cockpit or other compartments. The provision of pressurized structures as well as armor protection usually entails the addition of considerable weight to the airplane and complicates the design and construction. This has been found a particular disadvantage in modern high performance military airplanes of the fighter, pursuit and fighter-bomber types. The present invention is directed to improvements in the arrangement and structure of armored and pressurized cockpits, and eliminates many of the disadvantages of prior constructions while accomplishing advantages and results not hitherto attained.

The present cockpit arrangement comprises essentially a cylindrical cockpit sidewall and bottom portion terminating forwardly at an angular armored firewall and rearwardly at an angular armored protection plate, being assembled in two halves which are joined along the fore and aft vertical plane of symmetry of the compartment. The upper portion of the cockpit is provided with an enclosing canopy of an arcuate semi-spherical shape which can be moved forwardly and downwardly in a sliding relationship with respect to the side walls of the bottom portion from its closed into its retracted position in which it forms a windshield for the pilot. By virtue of the spherical cross-sectional shape of the canopy and the similar cross-sectional shape of the main compartment member, the present construction places its structural parts essentially in tension and is accordingly adapted for high pressurization with the provision of relatively little additional weight and material. The arcuate path of rotation of the canopy is such that in its retracted position, the forward portion of the canopy occupies a space closely behind the firewall and forward of the instrument panel and the rudder pedals thereby permitting a cockpit of minimum length and providing a minimum amount of armor close to the cockpit in a position in which it gives maximum protection. The present invention is also adapted for use in unarmored non-military aircraft.

It is accordingly a major object of the present invention to provide an armored and pressurized cockpit of improved design in which the cockpit size and length is reduced to a minimum consistent with the comfort and operability of the occupant and which affords a relatively high degree of both armor protection and pressurization with a minimum addition of structural weight. It is a further object to provide an improved cockpit arrangement in which the construction is simple and inexpensive, eliminating the requirement for the perfect fitting of the various parts and assemblies and reducing the need for extensive tooling. A further object of this invention resides in the provision of a transparent canopy of a part-spherical shape which is formed in one integral piece without a metallic framework and in which the visibility and safety is greatly improved.

A further object resides in an improved form, relationship and assembly arrangement of the components of an armored pressurized cockpit, comprising an armored firewall, a cylindrical tank main portion and an armored rear wall, all of which are assembled by bringing the halves together laterally for final attachment. It is also an object to provide such a transparent canopy in which its forward portion can be retracted to a position between the instrument panel and the firewall and in which position the rear portion serves as a windshield for the open cockpit. Another object is to provide a cockpit which is of a minimum length, requiring a minimum amount of armor close to the pilot where it gives him the maximum protection.

Another object of the invention resides in the provision of improved sealing means for pressurized cockpits and novel guide and operating fittings for breaking the seal and moving the canopy. Other objects and advantages of the present invention will become apparent to those skilled in the art after reading the present specification taken together with the accompanying drawings, forming a part hereof, in which:

Fig. 3 is a front elevational view of the compartment shown in Figs. 1 and 2 with the canopy in the retracted position;

Fig. 4 is a similar front elevational view showing the canopy in its closed position;

Fig. 5 is a detailed cross-section taken along the lines 5—5 of Figs. 2 and 6;

Fig. 6 is a side elevation of the wall of the compartment in the region in which the section in Fig. 5 was taken;

Fig. 7 is a detailed cross-section taken at the lines 7—7 of Fig. 2;

Fig. 8 is a detailed cross-sectional view of the operating handle, guide track and seal for the sliding canopy taken at the mid-portion;

Fig. 9 is a side elevational view of the mechanism shown in Fig. 8;

Fig. 10 is a cross-sectional view of the guide track showing a roller mounting;

Fig. 11 is a side elevational view of the same;

Fig. 12 is an enlarged detail of the seal at the forward edge of the canopy; and Fig. 13 is a detail of the seal at the trailing edge of the canopy.

Figure 1:
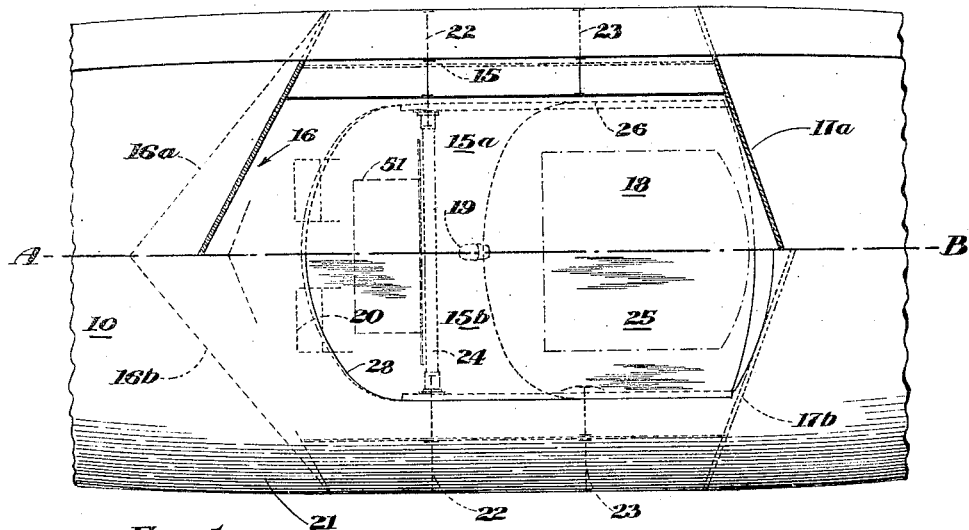
Fig. 1 is a plan view of a pilot compartment embodying the present invention.

Referring now to Figs. 1 to 4, inclusive, the numeral 10 indicates the fuselage of an airplane provided with a low monoplane wing 11 having a main spar 12, a rear spar 13 and an upper covering or skin surface 14. For purposes of illustrating the present invention, it has been shown and described as applied to a low wing monoplane of the single-seater type provided with a central fuselage. It should be noted, however, that the essential features of the present invention are equally adapted for use in other types of aircraft and for such other occupants as gunners, observers and the like.

The cockpit compartment is formed of a longitudinally arranged cylinder 15, preferably of duralumin or the like, having its upper wall portion removed, the lower portion of the remainder of the cylinder 15, being somewhat greater than a semi-circle in transverse cross-section, is split along the vertical longitudinal plane defined by the axis A—B of Fig. 1, forming the part-cylinder portions or arcuate sections 15a and 15b. A firewall 16 composed of angularly disposed sections 16a and 16b serves to close off the front end of the cylinder 15 and its rear end is closed off by the angularly disposed protective armor sections 17a and 17b of the wall 17. Within the cockpit there is provided a pilot's seat 18, a control stick 19 and rudder pedals 20.

The fuselage 10 is covered with suitable skin sheets 21 and adjacent the cockpit is provided with vertical frame members 22 and 23. A transverse tubular member 24 is provided across the cockpit between the upper portions of the fuselage frames 22. A canopy or enclosure 25 formed of a single integral piece of transparent Plexiglas, or other suitable material, is provided as a hood or cover to enclose the upper portion of the cockpit. The canopy 25 is semi-circular in transverse cross-section and in elevation it forms an arcuate portion of an annulus or ring having the center of its arcuate lower and outer edges at H. The adjacent and slightly lower numeral G, as shown in Fig. 2, locates the center of the fore and aft cylindrical component 15.

Figure 2:
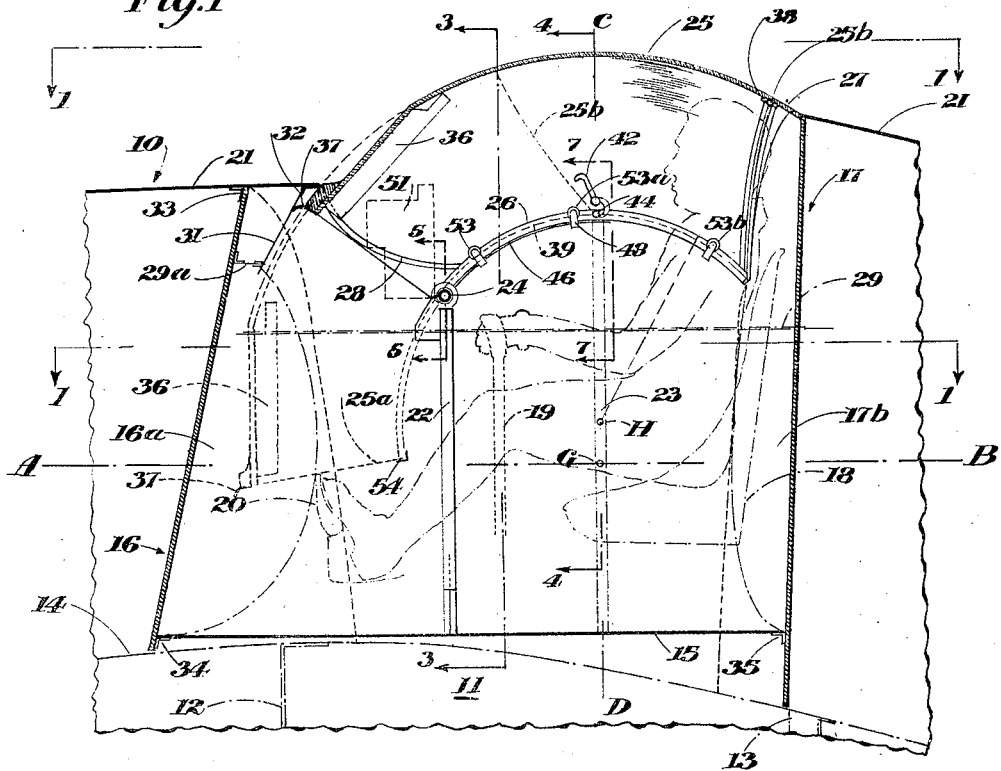
Fig. 2 is a side elevational view of the compartment shown in Fig. 1.

An arcuate guide track 26, having its center at H, is provided at the sides of the fuselage within which the lower outer edges of the enclosure 25 are free to slide from the full line position in Fig. 2 to the partially retracted position indicated by the construction lines in this figure. The guide track 26, which forms a part of the coaming of the cockpit in its open position, terminates rearwardly at 25b at the fixed transparent panel 27 at the rear of the compartment and is met at its forward portion 25a by the coaming 28 along the curved edge of the fuselage skin 21 as it closely meets the semi-circular profile of the canopy.

The cockpit compartment comprising the vertically split cylindrical portion 15 and the similarly split firewall and rear protective portions, 16 and 17, is structurally integrated with the fuselage by means of the longerons 29 and 30. The fuselage skin 21 is suitably attached to the firewall edge by means of the corner angle 33 and similar angles 34 and 35 serve to join the firewall and rear wall to the front and rear edges respectively of the cylindrical portion 15 in sealing relationship. A bulkhead apron portion formed by the plate 31 serves to frame and stiffen the front coaming 28 of the cockpit forward from the region of the intersection of the transverse frame 22 and the cross member 24, the plate 31 being suitably attached to the skin 21 as by the angle 32. The canopy 25 is provided with a bullet-proof glass windshield portion 36 adjacent its forward terminal and aligned with the normal forward lines of sight of the pilot.

The cockpit compartment is provided with suitable pressurizing means which are not shown and do not form a novel portion of the present invention. The fixed components of the cockpit comprising the firewall 16, rear armor 17, and the cylinder 15 are preferably initially assembled in two symmetrical halves and adapted to be brought together laterally for final assembly, meeting along the vertical longitudinal plane of symmetry defined by the axis A—B. All of these joints in the cockpit assembly are made pressure tight and pressure seals 37, 38 and 39 are provided at the front, rear and arcuate edges, respectively, of the sliding canopy 25. As shown in Fig. 12, the front edge or toe portion of the enclosure 25 is provided with a flexible rubbing strip 37 which bears against the plate 31 serving as a sealing sheet provided within the fuselage ahead of and below the forward edge of the transparent canopy when in its closed position. As shown in Fig. 13, the sealing means for the rear edge of the enclosure 25 is a bead or bulb section of flexible material 38 adapted to be compressed when the rear edge 25b of the enclosure 25 is moved into its aftermost or closed position touching the adjacent fixed portion 27.

The means for moving and locking the canopy in its several positions, as well as the manner of sealing its lateral edges against the internal pressure within the compartment, are shown in detail in Figs. 8 and 9. The arcuate guide track 26 is preferably a metallic extrusion of substantially H-form being attached at one of its flanges to the outer fuselage skin 21 and at an adjacent flange to the inner compartment lining. The lower lateral arcuate periphery of the enclosure 25 is provided with an inwardly extending reenforcement or lip portion 40 and is recessed at its opposite or outer face at 41 to receive a third flange of the guide member 26 in a flush relationship.

The toroidal, or tire shape, inverted U cross-section of the canopy formed about H as a center and having its lower outer edges at 40 will readily permit it to slide along the arcuate track 26. A part sealing strip of flexible material 39 is attached to an overhanging lip portion of the fourth flange of the guide track 26 which serves to prevent the enclosure from being lifted from the track in a vertical direction. Handles 42 are pivotally mounted upon the mid-portions of the enclosure at each side being rotatable upon the pivots 43. A pair of inwardly extending rollers 44 are mounted upon the fixed portion of the guide structure and are engageable by the lower or hooked portion 45 of the operating handles 42. An arcuate locking rail 46 is supported from and projects from the inner face of the guide track beneath the rollers 44 such that it is engageable by the outer face 45a of the hooked end 45. This lower portion of the handle is provided with inner and outer cam faces, the inner face 45b serving to engage the roller and to pull the canopy down to break the seal at the member 39, providing sufficient leverage to break the seal and secure the initial movement of the canopy. The outer cam face 45a serves as a locking cam and permits securing the enclosure at any intermediate position between its fully closed and fully open position, and at which open positions it need not engage a roller on its upper face as sealing would not be necessary.

In Figs. 10 and 11 there is shown the guide track arrangement at the roller 53a adjacent the high point of the guide track 26 in the region of the frame 23 along the vertical axis C—D. The arrangement of the rollers 53 and 53b at the front and rear portions of the guide track are also substantially similar to that shown in these two figures. The lower arcuate edge of the enclosure 25, is reenforced at 40 and recessed at 41 at its outer edge to receive the upstanding flange of the track element 26, as in the case of the section shown in Fig. 8. The roller 53a is pivotally mounted upon the pin 53p in the strap 48 attached by the screws 49 to the guide track member 26. The rollers 53, 53a and 53b are located such that as the canopy is caused to slide between its open and closed positions, the upper edge of the reenforcing lip member 40 engages the lower side of the rollers and is caused to move somewhat below the surface of the seal element 39 between these positions. The lip member 40 is provided with a plurality of detents 40a spaced such that when the canopy is in its fully closed position, at which it is desired to pressurize and seal the cockpit, the detents 40a are disposed beneath the rollers 53, 53a, 53b such that the canopy can be lifted by the internal pressure exerted upon it to the extent necessary to compress and make a tight seal against the flexible strip 39. Movement of the canopy from the closed and sealed position is accomplished, as indicated above, by the rearward rotation of the handle 42 such that the cam face 45b breaks the seal by forcing the enclosure downwardly and rearwardly a sufficient distance for the rollers 53, 53a, 53b to engage the upper surface of the lip 40 beyond the detents 40a to thereby free the entire enclosure.

The structural cross tube 24, which has been indicated in Figs. 1 and 2, it not necessarily an essential part of the cockpit construction, although it has been found to improve the structural arrangement as well as to provide the support for the flight and other instruments 51. By the inclusion of this cross member, the individual column lengths of certain of the adjacent intercostals and longerons are appropriately shortened, thereby providing increased rigidity of the entire structure.

In the event the cross member 24 is used, its ends may preferably be connected in the manner shown in Figs. 5, 6 and 7. A flanged socket fitting 52 is provided with a cylindrical bore to receive the outside diameter of each end of tube 24 to which it is rigidly attached. The fittings 52 also include an attachment portion by means of which they are secured to the guide fittings 26 and the attached wall plates as well as the flanges 22c of the inner and outer elements 22a and 22b of the composite frame 22. The fitting 52 is also provided with a transverse vertical web portion 52a by means of which it is attached to the web of the inner frame member 22b. A reenforcing strip 29b is attached beneath the skin 21 and to the outer flange of the vertical and horizontal frame elements 22a and 29 and a bent flat strip 29c is preferably provided intermediate the elements of the frame 22a and 22b and adjacent the attachment flange of the fitting 52.

The type of construction which has been shown has substantially reduced the weight heretofore found necessary in armored and pressurized compartments and eliminates the need for mechanically perfect fits, assemblies and extensive tooling in its production. It has thereby created an inexpensive unit of improved visibility and safety by the use of the molded plastic canopy or dome in which no metallic framework has been found necessary, and the ability to open the enclosure in flight and on the ground gives the added advantages of an open cockpit airplane. The shape of the duralumin cylinder, the wedge-shape of the protective front firewall and rear armor plates as well as the enclosure being arcuately formed around a radius in both its side elevation as well as cross-section, permits of appreciable pressurization of the compartment without the necessity of additional structural weight.

By the arrangement which has been shown and described herein, the cockpit length is held to a minimum to permit the placing of the armor plate close to the pilot to give him the maximum protection with the least amount of armor. Inasmuch as the end armor plates or bulkheads 16 and 17 each consist of two pieces joining on the vertical center line and since the cylinder 15 is also joined in two halves at the bottom on its center line, the cockpit unit can be completely assembled as two separate sides and then brought together and attached for the final assembly. In addition to permitting flight and taxiing of an open cockpit airplane, this arrangement also has the advantage that, should the windshield become covered with oil, frost, or otherwise rendered opaque, or due to breakage of the armored glass, the enclosure may be partially opened to the position shown in the dotted lines in Fig. 2 and the normal top or rear portion used as the windshield. In this windshield position it affords a good measure of protection to the pilot, the pilot controls, flight instruments and similar control instrumentalities in the unpressurized condition of the compartment.

Other forms and modifications of this invention, both with respect to its general arrangement and the details of its parts, which will become apparent to those skilled in the art to which it pertains are intended to fall within the scope and embrace of the invention as more particularly set forth in the appended claims.

I claim:

1. In a pressurized compartment, a body having spaced wall portions, said wall portions terminating in edges defining an opening in said body, a closure having edges arranged for relative movement along said wall portion edges to a position in which said body opening is closed for internal pressurization, overlapping lip portions carried by said body edges and said closure edges arranged to prevent separation of said body and said closure by internal pressurization, seal means interposed between the said lip portions arranged to maintain said internal pressure and manual means pivotally mounted upon said canopy adapted upon rotation about its pivot to cause separation of said lip portions for the breaking of said pressure seal and adapted for the application of manual forces upon said pivotal mounting for imparting relative movements of said canopy with respect to said body subsequent to the breaking of said pressure seal.

2. Aircraft cockpit construction comprising; a longitudinally extending arcuately cross-sectioned main member arranged with its lateral edges defining an opening in its upper portion; an armored fire wall disposed across the forward end of said main member; an armored protective wall disposed across the rear end of said main member; an arcuate track formed at the lateral edges of the opening; and a canopy of inverted U-shape section engaging said arcuate track for sliding movement in a longitudinally arcuate path between open and closed positions with respect to the opening.

3. Aircraft compartment construction comprising; a longitudinally extending arcuately cross-sectioned main member arranged with its lateral edges defining an opening in its upper portion; an armored fire wall disposed across the forward end of said main member; an armored protective wall disposed across the rear end of said main member; guide means formed at the lateral edges of the opening; a canopy of inverted U-shape section engaging said guide means for sliding movement in a longitudinally arcuate path between open and closed positions with respect to the opening; and sealing means disposed adjacent the edges of said canopy and those of said main member adapted to maintain increased internal pressures within said compartment.

4. An aircraft compartment comprising a transversely arcuate bottom portion; said bottom portion having upwardly extending longitudinally arcuate lateral sides; an armored front wall portion and a rear cross wall portion; arcuate guide means carried by the lateral sides of said arcuate bottom portion; and a canopy of inverted U-shape cross-section having lateral edges slidably engageable with said guide means for longitudinally arcuate movements between a fully closed position substantially above the compartment to a partially retracted position within the forward portion of the compartment in which a remaining extending portion of the canopy serves as a windshield for said compartment.

5. An aircraft cockpit arrangement comprising; a compartment formed by a transversely arcuate bottom portion having upwardly directed sides; an armored cross wall front portion and an armored cross wall rear portion; arcuate guide means carried by the sides of said bottom portion; a transversely arcuate canopy having downwardly directed lateral edges slidably engageable with said guide means for movement between its fully closed position substantially above the occupant of the cockpit, to its retracted position substantially forward of the occupant; and sealing means associated with said guide means and the edges of said canopy adapted to provide a pressure-tight seal in the closed position of said canopy.

6. An aircraft pilot position comprising; a compartment formed of a bottom portion, a forwardly converging firewall at its forward portion and a rearwardly converging wall at its rear portion; arcuate guides at the lateral edges of said compartment defining an opening in the upper portions thereof; a pilot seat supported within the rear portion of said compartment; pilot controls movably supported in the bottom forward portion of said compartment; flight instrument means supported within said compartment in a position substantially forward of the pilot occupying said seat and substantially above said pilot controls; means for internally pressurizing said compartment; and a canopy adapted to serve as a closure for said compartment opening slidably engaging said arcuate guides to form an airtight seal therewith and cooperating with the said bottom, forward, and rear wall portions forming said compartment to permit of its internal pressurization; said canopy being disposed in its said closed position substantially above said seated pilot, pilot controls and flight instruments in the pressurized condition of said compartment, the said canopy being movable to an open retracted position forward of, and with its forward portion below said flight instrument means in which forward position the rearward upper exposed portion of the canopy serves as a windshield for the protection of said seated pilot, pilot controls and flight instruments in the unpressurized condition of said compartment.

7. In an airplane; a fuselage; a pilot control compartment within said fuselage having an opening through its upper surface; flight control instrumentalities carried within the forward portion of said compartment and spaced from the forward walls thereof to provide a recess; a pilot seat carried by said compartment within its rear portion; a canopy slidably associated with said compartment for fore and aft movement in an arcuate path arranged to provide a closure for said compartment opening in a rearwardly and upwardly extended position of said canopy, and arranged to provide a windshield for the pilot and said control instrumentalities in a forwardly and downwardly partially retracted position within said fuselage compartment recess forward of the pilot and said control instrumentalities.

8. In a pressurized pilot compartment; a transversely arcuate body portion having an opening through its upper surface; said body portion having transverse longitudinally spaced forward and rear walls; a transversely and longitudinally arcuate canopy having vertically disposed parallel side portions; guide and seal means carried by the adjacent edges of said body opening and said canopy side portions; means to internally pressurize said compartment assisted by said transverse longitudinally spaced forward and rear walls placing the said side portions of said canopy in tension without bending forces; said canopy movably mounted upon said body portion guide means arranged in one of its positions to cooperate with said body portion and said transverse walls as a closure for said opening in the pressurized condition of said pilot compartment, and in another position to form a windshield for said open compartment in its unpressurized state.

9. In pressurized aircraft: a fuselage having a pressure compartment formed therein; said compartment having a forwardly converging front wall and a rearwardly converging rear wall; said compartment having an opening through its upper outer covering to provide access thereto; means for internally pressurizing said compartment; a canopy of semi-circular cross-section and of partial annular shape in elevation arranged to form a closure for the opening in said compartment; said canopy having vertically disposed parallel side portions; arcuate guide means carried by said fuselage and said canopy vertical side portions arranged for the arcuate sliding of said canopy from a closed position above said opening to a partially retracted position within said fuselage in which the trailing portion of said canopy serves as a windshield for said compartment; said guide means formed with overlying lip portions arranged to prevent outward removal of said canopy from said fuselage by internal pressure; seal means disposed between said overlying lip portions presenting sealing surfaces normal to said vertical side portions to prevent air leakage from said compartment upon its internal pressurization, said sealing surfaces assisted by the vertical tensile pull of said canopy side portions against said sealing surfaces, the said annular shape and semi-circular cross-section of said canopy, converging front and rear compartment walls, overlying lipped guide and seal means cooperating to assist said compartment to withstand said internal pressurization.

10. In a pressurized body: a compartment having pressure-tight wall portions terminating in upper edges defining an opening; a closure having edges arranged for relative sliding movement along said wall portion edges to a position in which said body opening is closed for internal pressurization in which said closure edges are subject to tensile forces; means for internally pressurizing said compartment; vertically overlapping laterally extending lip portions carried by said body edges and by said closure edges transversely disposed with respect to the direction of said tensile forces arranged to oppose said forces and to prevent separation of said body and said closure due to said internal pressurization; seal means intermediately disposed between the said overlapping lip portions arranged to be increasingly compressed by said tensile forces as said internal pressurization is increased to thereby maintain said internal pressure within said compartment; and manually operated pivotal means cooperatively engaging said closure and said compartment wall arranged to separate said lip portions by drawing said closure toward said compartment for the breaking of said intermediate seal to permit said relative sliding movements of said canopy with respect to said body.

JULIUS G. VILLEPIGUE.

REFERENCES CITED

The following references are of record in the file of this patent:

UNITED STATES PATENTS

| Number | Name | Date |
| --- | --- | --- |
| 1,784,279 | Ellerbeck | Dec. 9, 1930 |
| 2,214,722 | Seversky | Sept. 10, 1940 |
| 2,306,575 | Tuttle | Dec. 29, 1942 |
| 2,317,945 | Sherts | Apr. 27, 1943 |
| 2,332,158 | Magill et al. | Oct. 19, 1943 |
| 2,367,035 | McConnell | Jan. 9, 1945 |

FOREIGN PATENTS

| Number | Country | Date |
| --- | --- | --- |
| 6,130 | Great Britain | of 1913 |
| 465,537 | France | Feb. 9, 1914 |